(12) United States Patent
Kortum et al.

(10) Patent No.: US 7,716,714 B2
(45) Date of Patent: May 11, 2010

(54) SYSTEM AND METHOD FOR RECORDING TELEVISION CONTENT AT A SET TOP BOX

(75) Inventors: Philip Ted Kortum, Austin, TX (US); Marc Andrew Sullivan, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1223 days.

(21) Appl. No.: 11/001,683

(22) Filed: Dec. 1, 2004

(65) Prior Publication Data

US 2006/0117374 A1 Jun. 1, 2006

(51) Int. Cl.
*H04N 7/16* (2006.01)

(52) U.S. Cl. ................... 725/139; 386/124

(58) Field of Classification Search ............ 725/46, 725/58, 88, 30, 133, 141, 153
See application file for complete search history.

(56) References Cited

U.S. PATENT DOCUMENTS

| | | | |
|---|---|---|---|
| 4,243,147 A | 1/1981 | Twitchell et al. |
| 4,356,509 A | 10/1982 | Skerlos et al. |
| 4,768,926 A | 9/1988 | Gilbert, Jr. |
| 4,907,079 A | 3/1990 | Turner et al. |
| 5,126,731 A | 6/1992 | Cromer, Jr. et al. |
| 5,163,340 A | 11/1992 | Bender |
| 5,475,835 A | 12/1995 | Hickey |
| 5,532,748 A | 7/1996 | Naimpally |
| 5,541,917 A | 7/1996 | Farris |
| 5,589,892 A | 12/1996 | Knee et al. |
| 5,592,477 A | 1/1997 | Farris et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |

(Continued)

FOREIGN PATENT DOCUMENTS

WO    WO 99/63759 A2    12/1999

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner*—Brian T Pendleton
*Assistant Examiner*—Cai Chen
(74) *Attorney, Agent, or Firm*—Toler Law Group

(57) ABSTRACT

A method of recording content at a set top box is provided and includes receiving a request to record multiple episodes of a television program. When a copy of a particular episode that has been previously stored in the memory of the set top box is received, a set top box selectively fails to record that particular episode of the television program. Further, the method includes monitoring metadata within an electronic program guide received at the set top box. Using the metadata, a set top box can determine when the particular episode of the television program is to be received and recorded at the set top box.

25 Claims, 3 Drawing Sheets

U.S. PATENT DOCUMENTS

| | | |
|---|---|---|
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,601,074 B1 | 7/2003 | Liebenow |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |

| | | | | | |
|---|---|---|---|---|---|
| 2001/0011261 A1 | 8/2001 | Mullen-Schultz | 2003/0012365 A1 | 1/2003 | Goodman |
| 2001/0016945 A1 | 8/2001 | Inoue | 2003/0014750 A1 | 1/2003 | Kamen |
| 2001/0016946 A1 | 8/2001 | Inoue | 2003/0018975 A1 | 1/2003 | Stone |
| 2001/0034664 A1 | 10/2001 | Brunson | 2003/0023435 A1 | 1/2003 | Josephson |
| 2001/0044794 A1 | 11/2001 | Nasr et al. | 2003/0023440 A1 | 1/2003 | Chu |
| 2001/0048677 A1 | 12/2001 | Boys | 2003/0028890 A1 | 2/2003 | Swart et al. |
| 2001/0049826 A1 | 12/2001 | Wilf | 2003/0033416 A1 | 2/2003 | Schwartz |
| 2001/0054008 A1 | 12/2001 | Miller et al. | 2003/0043915 A1 | 3/2003 | Costa et al. |
| 2001/0054009 A1 | 12/2001 | Miller et al. | 2003/0046091 A1 | 3/2003 | Arneson et al. |
| 2001/0054067 A1 | 12/2001 | Miller et al. | 2003/0046689 A1 | 3/2003 | Gaos |
| 2001/0056350 A1 | 12/2001 | Calderone et al. | 2003/0056223 A1 | 3/2003 | Costa et al. |
| 2002/0001303 A1 | 1/2002 | Boys | 2003/0058277 A1 | 3/2003 | Bowman-Amuah |
| 2002/0001310 A1 | 1/2002 | Mai et al. | 2003/0061611 A1 | 3/2003 | Pendakur |
| 2002/0002496 A1 | 1/2002 | Miller et al. | 2003/0071792 A1 | 4/2003 | Safadi |
| 2002/0003166 A1 | 1/2002 | Miller et al. | 2003/0093793 A1 | 5/2003 | Gutta |
| 2002/0007307 A1 | 1/2002 | Miller et al. | 2003/0100340 A1 | 5/2003 | Cupps et al. |
| 2002/0007313 A1 | 1/2002 | Mai et al. | 2003/0110161 A1 | 6/2003 | Schneider |
| 2002/0007485 A1 | 1/2002 | Rodriguez et al. | 2003/0110503 A1 | 6/2003 | Perkes |
| 2002/0010639 A1 | 1/2002 | Howey et al. | 2003/0126136 A1 | 7/2003 | Omoigui |
| 2002/0010745 A1 | 1/2002 | Schneider | 2003/0135771 A1 | 7/2003 | Cupps et al. |
| 2002/0010935 A1 | 1/2002 | Sitnik | 2003/0141987 A1 | 7/2003 | Hayes |
| 2002/0016736 A1 | 2/2002 | Cannon et al. | 2003/0145321 A1 | 7/2003 | Bates et al. |
| 2002/0022963 A1 | 2/2002 | Miller et al. | 2003/0149988 A1* | 8/2003 | Ellis et al. .................. 725/87 |
| 2002/0022970 A1 | 2/2002 | Noll et al. | 2003/0149989 A1 | 8/2003 | Hunter et al. |
| 2002/0022992 A1 | 2/2002 | Miller et al. | 2003/0153353 A1 | 8/2003 | Cupps et al. |
| 2002/0022993 A1 | 2/2002 | Miller et al. | 2003/0153354 A1 | 8/2003 | Cupps et al. |
| 2002/0022994 A1 | 2/2002 | Miller et al. | 2003/0159026 A1 | 8/2003 | Cupps et al. |
| 2002/0022995 A1 | 2/2002 | Miller et al. | 2003/0160830 A1 | 8/2003 | DeGross |
| 2002/0023959 A1 | 2/2002 | Miller et al. | 2003/0163601 A1 | 8/2003 | Cupps et al. |
| 2002/0026357 A1 | 2/2002 | Miller et al. | 2003/0163666 A1 | 8/2003 | Cupps et al. |
| 2002/0026358 A1 | 2/2002 | Miller et al. | 2003/0172380 A1 | 9/2003 | Kikinis |
| 2002/0026369 A1 | 2/2002 | Miller et al. | 2003/0182237 A1 | 9/2003 | Costa et al. |
| 2002/0026475 A1 | 2/2002 | Marmor | 2003/0182420 A1 | 9/2003 | Jones et al. |
| 2002/0029181 A1 | 3/2002 | Miller et al. | 2003/0185232 A1 | 10/2003 | Moore et al. |
| 2002/0030105 A1 | 3/2002 | Miller et al. | 2003/0187641 A1 | 10/2003 | Moore et al. |
| 2002/0032603 A1 | 3/2002 | Yeiser | 2003/0187646 A1 | 10/2003 | Smyers et al. |
| 2002/0035404 A1 | 3/2002 | Ficco et al. | 2003/0187800 A1 | 10/2003 | Moore et al. |
| 2002/0040475 A1 | 4/2002 | Yap et al. | 2003/0189509 A1 | 10/2003 | Hayes et al. |
| 2002/0042915 A1 | 4/2002 | Kubischta et al. | 2003/0189589 A1 | 10/2003 | LeBlanc et al. |
| 2002/0046093 A1 | 4/2002 | Miller et al. | 2003/0194141 A1 | 10/2003 | Kortum et al. |
| 2002/0049635 A1 | 4/2002 | Mai et al. | 2003/0194142 A1 | 10/2003 | Kortum et al. |
| 2002/0054087 A1 | 5/2002 | Noll et al. | 2003/0208396 A1 | 11/2003 | Miller et al. |
| 2002/0054750 A1 | 5/2002 | Ficco et al. | 2003/0208758 A1 | 11/2003 | Schein et al. |
| 2002/0059163 A1 | 5/2002 | Smith | 2003/0226044 A1 | 12/2003 | Cupps et al. |
| 2002/0059425 A1 | 5/2002 | Belfiore et al. | 2003/0226145 A1 | 12/2003 | Marsh |
| 2002/0059599 A1 | 5/2002 | Schein et al. | 2003/0229900 A1 | 12/2003 | Reisman |
| 2002/0065717 A1 | 5/2002 | Miller et al. | 2004/0003041 A1 | 1/2004 | Moore et al. |
| 2002/0067438 A1 | 6/2002 | Baldock | 2004/0003403 A1 | 1/2004 | Marsh |
| 2002/0069220 A1 | 6/2002 | Tran | 2004/0006769 A1 | 1/2004 | Ansari et al. |
| 2002/0069282 A1 | 6/2002 | Reisman | 2004/0006772 A1 | 1/2004 | Ansari et al. |
| 2002/0069294 A1 | 6/2002 | Herkersdorf et al. | 2004/0010602 A1 | 1/2004 | Van Vleck et al. |
| 2002/0072970 A1 | 6/2002 | Miller et al. | 2004/0013401 A1* | 1/2004 | Kasutani et al. ................ 386/46 |
| 2002/0078442 A1 | 6/2002 | Reyes et al. | 2004/0015997 A1 | 1/2004 | Ansari et al. |
| 2002/0097261 A1 | 7/2002 | Gottfurcht et al. | 2004/0030750 A1 | 2/2004 | Moore et al. |
| 2002/0106119 A1 | 8/2002 | Foran et al. | 2004/0031058 A1 | 2/2004 | Reisman |
| 2002/0112239 A1 | 8/2002 | Goldman | 2004/0031856 A1 | 2/2004 | Atsmon et al. |
| 2002/0116392 A1 | 8/2002 | McGrath et al. | 2004/0034877 A1 | 2/2004 | Nogues |
| 2002/0124055 A1 | 9/2002 | Reisman | 2004/0049728 A1 | 3/2004 | Langford |
| 2002/0128061 A1 | 9/2002 | Blanco | 2004/0064351 A1 | 4/2004 | Mikurak |
| 2002/0129094 A1 | 9/2002 | Reisman | 2004/0068740 A1 | 4/2004 | Fukuda et al. |
| 2002/0133402 A1 | 9/2002 | Faber et al. | 2004/0068753 A1 | 4/2004 | Robertson et al. |
| 2002/0138840 A1 | 9/2002 | Schein et al. | 2004/0070491 A1 | 4/2004 | Huang et al. |
| 2002/0152264 A1 | 10/2002 | Yamasaki | 2004/0073918 A1 | 4/2004 | Ferman et al. |
| 2002/0169611 A1 | 11/2002 | Guerra et al. | 2004/0098571 A1 | 5/2004 | Falcon |
| 2002/0170063 A1 | 11/2002 | Ansari et al. | 2004/0107125 A1 | 6/2004 | Guheen et al. |
| 2002/0173344 A1 | 11/2002 | Cupps et al. | 2004/0107439 A1 | 6/2004 | Hassell et al. |
| 2002/0174430 A1* | 11/2002 | Ellis et al. .................. 725/46 | 2004/0111745 A1 | 6/2004 | Schein et al. |
| 2002/0188955 A1 | 12/2002 | Thompson et al. | 2004/0111756 A1 | 6/2004 | Stuckman et al. |
| 2002/0193997 A1 | 12/2002 | Fitzpatrick et al. | 2004/0117813 A1 | 6/2004 | Karaoguz et al. |
| 2002/0194601 A1 | 12/2002 | Perkes et al. | 2004/0117824 A1 | 6/2004 | Karaoguz et al. |
| 2002/0198874 A1 | 12/2002 | Nasr et al. | 2004/0128342 A1 | 7/2004 | Maes et al. |
| 2003/0005445 A1 | 1/2003 | Schein et al. | 2004/0139173 A1 | 7/2004 | Karaoguz et al. |
| 2003/0009771 A1 | 1/2003 | Chang | 2004/0143600 A1 | 7/2004 | Musgrove et al. |

| | | | |
|---|---|---|---|
| 2004/0143652 | A1 | 7/2004 | Grannan et al. |
| 2004/0148408 | A1 | 7/2004 | Nadarajah |
| 2004/0150676 | A1 | 8/2004 | Gottfurcht et al. |
| 2004/0183839 | A1 | 9/2004 | Gottfurcht et al. |
| 2004/0194136 | A1 | 9/2004 | Finseth et al. |
| 2004/0198386 | A1 | 10/2004 | Dupray |
| 2004/0201600 | A1 | 10/2004 | Kakivaya et al. |
| 2004/0210633 | A1 | 10/2004 | Brown et al. |
| 2004/0210935 | A1 | 10/2004 | Schein et al. |
| 2004/0213271 | A1 | 10/2004 | Lovy et al. |
| 2004/0221302 | A1 | 11/2004 | Ansari et al. |
| 2004/0223485 | A1 | 11/2004 | Arellano et al. |
| 2004/0226035 | A1 | 11/2004 | Hauser, Jr. |
| 2004/0226045 | A1 | 11/2004 | Nadarajah |
| 2004/0239624 | A1 | 12/2004 | Ramian |
| 2004/0252119 | A1 | 12/2004 | Hunleth et al. |
| 2004/0252120 | A1 | 12/2004 | Hunleth et al. |
| 2004/0252769 | A1 | 12/2004 | Costa et al. |
| 2004/0252770 | A1 | 12/2004 | Costa et al. |
| 2004/0260407 | A1 | 12/2004 | Wimsatt |
| 2004/0261116 | A1 | 12/2004 | McKeown et al. |
| 2004/0267729 | A1 | 12/2004 | Swaminathan et al. |
| 2004/0268393 | A1 | 12/2004 | Hunleth et al. |
| 2005/0027851 | A1 | 2/2005 | McKeown et al. |
| 2005/0038814 | A1 | 2/2005 | Iyengar et al. |
| 2005/0044280 | A1 | 2/2005 | Reisman |
| 2005/0097612 | A1 | 5/2005 | Pearson et al. |
| 2005/0132295 | A1 | 6/2005 | Noll et al. |
| 2005/0195961 | A1 | 9/2005 | Pasquale et al. |
| 2005/0204388 | A1* | 9/2005 | Knudson et al. .............. 725/58 |
| 2005/0271363 | A1* | 12/2005 | Tanikawa .................... 386/83 |

FOREIGN PATENT DOCUMENTS

| | | |
|---|---|---|
| WO | WO 00/28689 A2 | 5/2000 |
| WO | WO 01/60066 A1 | 8/2001 |
| WO | WO 02/17627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/148,967, filed Jun. 9, 2005.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
International Search Report for International Application No. PCT/US05/41306, mailed on Oct. 25, 2006.
Written Opinion of the International Searching Authority for PCT/US05/41306, mailed on Oct. 25, 2006.

* cited by examiner

SYSTEM AND METHOD FOR RECORDING TELEVISION CONTENT AT A SET TOP BOX

FIELD OF THE DISCLOSURE

The present disclosure relates generally to the recording of television content at a set top box.

BACKGROUND

Many set top boxes that are currently available include a digital video recorder (DVR). A DVR can record content that is received at a set top box and store the content at a memory device for playback at a later time. The DVR can record content in several ways. For example, a user can tune to a selected program and the DVR can automatically buffer the content at a memory device while the user is watching the program in case the user wants to "pause" the show. Also, a user can manually select a program to be recorded by the DVR based on the title of the program or based on the time that the program is schedule to be broadcast. Finally, a user can program the DVR to record multiple broadcasts of a particular program, e.g., different episodes of a television series.

In the situation where a user programs the DVR to record multiple episodes of a particular program, storage space at the memory device can be very quickly consumed, especially if the same episode of a particular program is recorded more than once. As the storage space is consumed, less unique programs, songs, pictures, and other content may be recorded by the DVR, thereby reducing the usefulness of the DVR.

Accordingly, there is a need for an improved system and method for recording television content at a set top box.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
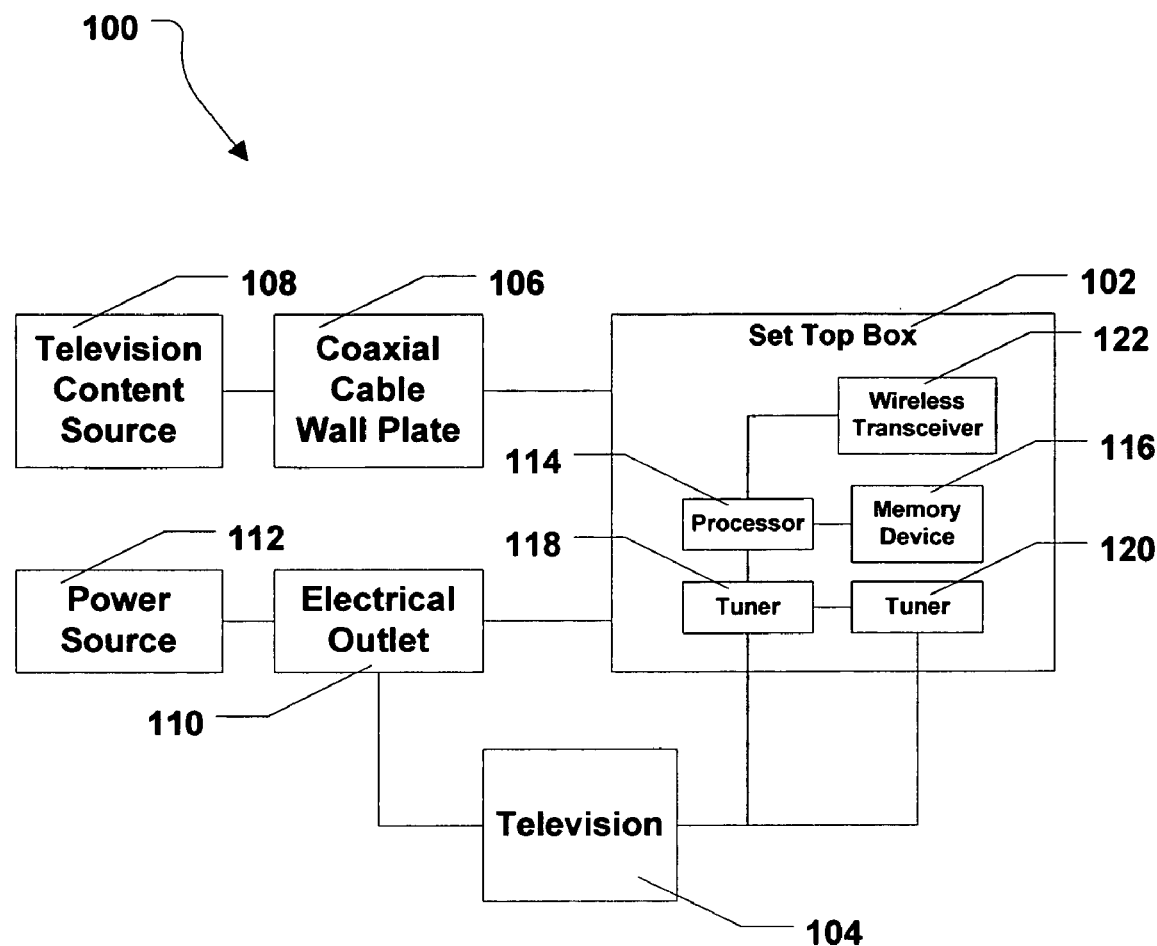
FIG. 1 is a block diagram of an embodiment of a home entertainment system.

A method of recording content at a set top box is provided and includes receiving a request to record multiple episodes of a television program. When a copy of a particular episode that has been previously stored in the memory of the set top box is received, a set top box selectively fails to record that particular episode of the television program. Further, the method includes monitoring metadata within an electronic program guide received at the set top box. Using the metadata, a set top box can determine when the particular episode of the television program is to be received and recorded at the set top box.

In a particular embodiment, the method also includes determining whether the particular episode of the television program scheduled for recording is presently recorded and stored at the set top box. The method further includes detecting a duplicate episode and selectively failing to record the duplicate episode. Additionally, the method includes determining if an episode was previously recorded at the set top box and determining if the previously recorded episode was viewed at a television coupled to the set top box. In a particular embodiment, the set top box can selectively fail to record an episode that was previously recorded and viewed. In the alternative, the set top box can selectively record an episode of a television program that is not presently recorded and stored at the set top box and the set top box can record an episode of a television program that has not been previously recorded. Further, the set top box can record an episode of a television program that was been previously recorded and deleted, but not viewed.

In a particular embodiment, the method also includes adding a title that corresponds to each of the episodes of the television program that are recorded at the set top box to a recorded program list. The titles of the recorded program list can be sorted by original air dates or alphabetically.

In another embodiment, a set top box includes a processor, a memory device that is accessible by the processor, and a computer program that is embedded within the memory device. The computer program includes instructions to detect a request to record multiple episodes of a television program. Also, the computer program includes instructions to detect a received episode that is a duplicate of an episode stored in the memory device. Further, the computer program includes instructions to selectively fail to record the duplicate episode of the television program.

In yet another embodiment, a home entertainment system includes a television and a set top box that is coupled to the television. The set top box includes a processor, a memory device accessible by the processor, and a computer program that is embedded within the memory device. The computer program includes instructions to detect a request to record all episodes of a television program and instructions to selectively fail to record one or more duplicate episodes of the television program, when the one or more duplicate episode is received at the set top box.

Referring to FIG. 1, an exemplary, non-limiting home entertainment system is shown and is generally designated 100. As illustrated in FIG. 1, the home entertainment system 100 includes a set top box 102 that is coupled to a television 104. FIG. 1 also shows that the set top box 102 is coupled to a cable wall plate 106 via a cable and the cable wall plate 106, in turn, is coupled to a television content source 108. In a particular embodiment, the set top box 102 is coupled to the cable wall plate via a coaxial cable, a category five (CAT-5) cable, or a telephone cable. Further, television content can be provided to the cable wall plate 106 via a coaxial cable, a CAT-5 cable, or a telephone cable. Further, the television content source 108 can be a digital content provider and the digital content can be broadcast to the system 100 via a satellite connection.

FIG. 1 further depicts that the television 104 is coupled to an electrical outlet 110. The electrical outlet 110 is also coupled to a power source 112. In a particular embodiment, the power source 112 is a one-hundred and ten/one-hundred and twenty volt (110/120V) alternating current (AC) power source. As depicted in FIG. 1, the set top box 102 is also coupled to the electrical outlet 110 and receives power from the power source 112.

FIG. 1 depicts that the set top box 102 includes a processor 114 coupled to a memory device 116. In a particular embodiment, the memory device 116 is a flash memory device or any other type of electronically erasable programmable read only memory (EEPROM) device or other non-volatile memory device, such as a hard disk drive. Further, the memory device 116 can be a random access memory (RAM) device. As illustrated in FIG. 1, the set top box 102 further includes a first television tuner 118 and a second television tuner 120 that are each coupled to the processor. The television tuners 118, 120 can decode digital television signals received at the set top box 102 and transmit the decrypted digital television signals to the television 104.

Further, the processor 114 can execute a computer program in order to record any or all of the decoded digital television signals at the memory device 116. FIG. 1 also shows that the set top box 102 can include a wireless transceiver 122. The wireless transceiver 122 can allow the set top box 102 to communicate with a wireless network, another set top box, or any other device having a wireless transceiver. In a particular embodiment, the wireless transceiver 122 is a radio frequency (RF) transceiver, an ultra high frequency (UHF) transceiver, or a wireless high fidelity (Wi-Fi) transceiver, such as an 802.11 transceiver.

Figure 2:
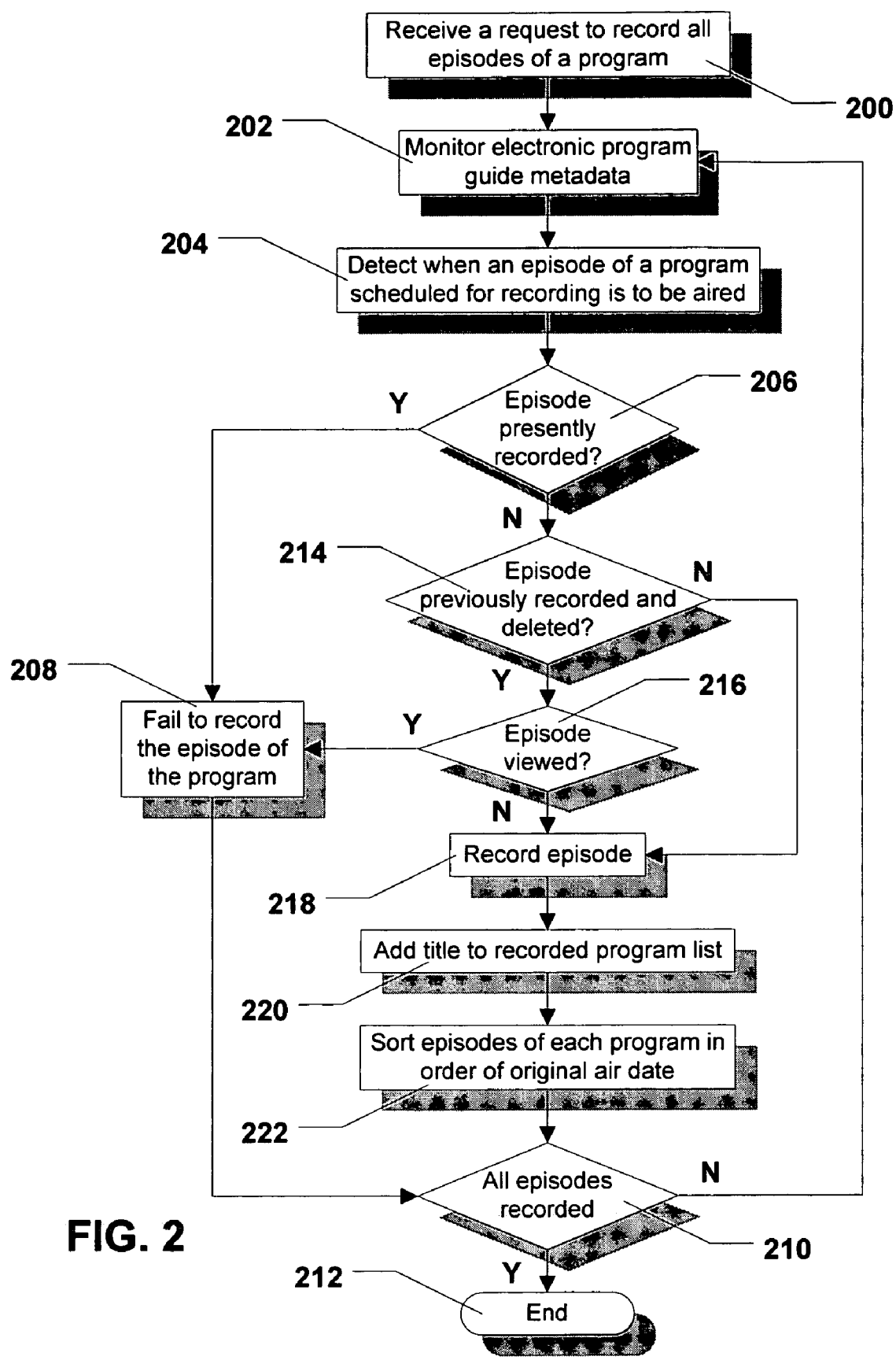
FIG. 2 is a flow chart to illustrate an embodiment of a method of recording television content at a set top box.

Referring now to FIG. 2, a method for recording television content at a set top box is illustrated and commences at block 200. At block 200, the set top box receives a request to record all of the episodes of a particular program. For example, a user can set the set top box to record all episodes of "The Simpsons" which is shown in re-runs many times a week. Moving to block 202, the set top box monitors metadata that is received at the set top box with an electronic program guide. In a particular embodiment, the electronic program guide is a program guide that can be presented at a television and can include information, such as program title, program type, episode title, episode synopsis, episode rating, closed captioning information, broadcast date, broadcast time, and channel information. In a digital system, the data comprising the electronic program guide and the metadata associated with the electronic program guide is transmitted as part of the Advanced Television Systems Committee Motion Pictures Experts Group-Two (ATSC MPEG-2) stream.

Continuing to block 204, the set top box detects when an episode of a program scheduled for recording is to be aired based on the metadata within the electronic program guide. At decision step 206, the set top box determines whether the particular episode is presently recorded and stored at the set top box. If the episode is presently recorded and stored at the set top box, the method proceeds to block 208 and the set top box selectively fails to record this episode of the program. Thus, multiple duplicate copies of the same episode are not recorded. Next, at decision step 210, the set top box determines whether all episodes of the television program have been recorded. If so, the logic ends at state 212. Conversely, if all episodes of a particular program have not been recorded, the method returns to block 202 and continues as described herein.

Returning to decision step 206, if the set top box determines that the episode of the television program is not presently recorded and stored, the method moves to decision step 214. At decision step 214, the set top box determines if the episode of the television program has been previously recorded and deleted. If the episode has been previously recorded, the method proceeds to decision step 216 and the set top box determines whether the episode has been viewed. The logic then moves to block 208 and the set top box selectively fails to record the episode that was preciously recorded and viewed. From block 208, the logic moves to decision step 210 and continues as described above.

Returning to decision step 214, if the set top box determines that the present episode of the television program has not been previously recorded and viewed the method continues to block 218 and the set top box records the present episode of the television program. Additionally, at decision step 216, if the set top box determines that the previously recorded and deleted episode was not been viewed, the method moves to block 218 and the set top box records the episode of the television program. In a particular embodiment, the set top box may automatically erase one or more previously recorded episodes after a predetermined time frame or if more memory space within the memory device is required, such as by another application. As such, a user may record an episode of a program and fail to view that episode before it is automatically deleted by the set top box.

From block 218, the method moves to block 220 and the set top box adds the title of the recorded episode to a recorded program list that can be presented to a user via a graphical user interface. Thereafter, at block 222, the set top box sorts the episodes of each program, such as in order of original air date. In an alternative embodiment, the episodes may be sorted alphabetically. Further, the episodes may be sorted by the date that each episode is record. Moving to decision step 210, the set top box determines whether all episodes of a particular program have been recorded. If not, the logic returns to block 202 and continues as described above. On the other hand, if all episodes have been recorded, the logic ends at state 212.

Figure 3:
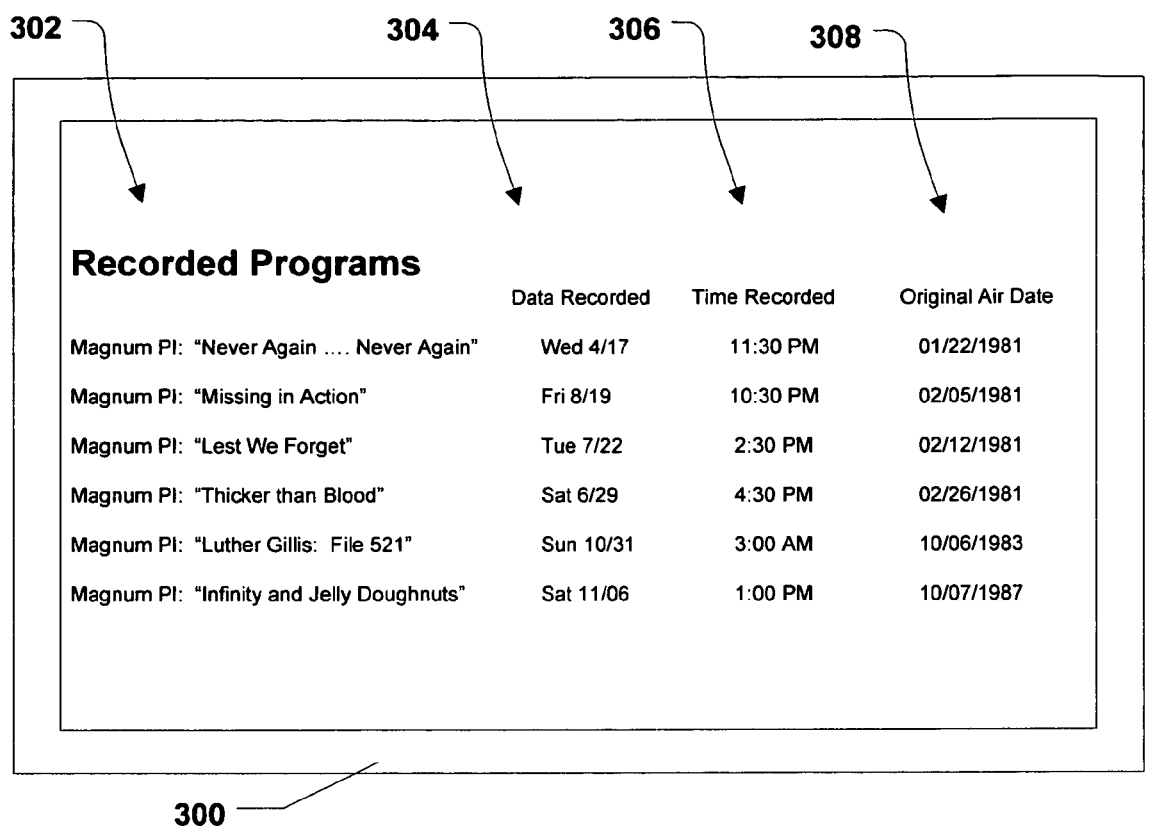
FIG. 3 is a diagram of an embodiment of a graphical user interface.

Referring now to FIG. 3, an exemplary non-limiting embodiment of a graphical user interface (GUI) is shown and is generally designated 300. In a particular embodiment, the GUI 300 can be used to present one or more stored episodes of a program to a user. As illustrated in FIG. 3, the GUI 300 can include a recorded programs list 302. In a particular embodiment, the recorded programs list 302 can include one or more episode titles that correspond to episodes that are stored at a set top box. Further, the GUI 300 can include a date recorded 304 and a time recorded 306 for each title in the recorded programs list 302. Additionally, the GUI 300 can include an original air data 308 for each title in the recorded programs list 302. A user can us a remote control device to scroll up or down within the recorded programs list 302 in order to select a particular episode for viewing.

With the configuration of structure described above, the system and method of recording content at a set top box avoids recording the same episode of a particular program numerous times, thereby reducing consumption of memory at the set top box.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recording content at a set top box, the method comprising:

receiving a request to record multiple episodes of a television program;

determining whether a particular episode of the multiple episodes was previously stored in and deleted from a memory of the set top box;

determining whether the particular episode was previously viewed;

automatically failing to record the particular episode without user input when the particular episode was previously stored in the memory and after being stored in the memory the particular episode was deleted from the memory after being viewed; and automatically recording the particular episode without user input when the particular episode was previously stored in the memory and after being stored in the memory the particular episode was deleted from the memory without being viewed.

2. The method of claim 1, further comprising monitoring metadata within an electronic program guide received at the set top box.

3. The method of claim 2, further comprising determining when the particular episode is to be received and recorded at the set top box at least partially based on the monitored metadata.

4. The method of claim 3, further comprising determining whether the particular episode scheduled for recording is presently recorded and stored at the set top box.

5. The method of claim 4, further comprising detecting a duplicate episode and selectively failing to record the duplicate episode.

6. The method of claim 1, further comprising determining whether a previously recorded episode was viewed at a television coupled to the set top box.

7. The method of claim 1, further comprising recording an episode of the television program that has not been previously recorded.

8. The method of claim 7, further comprising adding a title corresponding to each of the episodes of the television program recorded at the set top box to a recorded program list.

9. The method of claim 8, further comprising sorting the titles of the recorded program list by original air dates.

10. The method of claim 8, further comprising sorting the titles of the recorded program list alphabetically.

11. A set top box, comprising:
a processor;
a memory device accessible by the processor; and
a computer program embedded within the memory device, the computer program comprising:
instructions to detect a request to record multiple episodes of a television program;
instructions to detect a received episode that is a duplicate of an episode that has been previously stored in and deleted from the memory device;
instructions to detect whether the received episode previously stored and deleted has been previously viewed;
instructions to automatically fail to record the received episode without user input when the received episode was stored in the memory and after being stored in the memory the received episode was deleted from the memory after being viewed; and
instructions to automatically record the received episode without user input when the received episode was stored in the memory and after being stored in the memory the received episode was deleted from the memory without being viewed.

12. The set top box of claim 11, wherein the computer program further comprises instructions to monitor metadata within an electronic program guide received at the set top box.

13. The set top box of claim 12, wherein the computer program further comprises instructions to record the received episode of the television program when the received episode is not stored in the memory device.

14. The set top box of claim 13, wherein the computer program further comprises instructions to add a title corresponding to each recorded episode of the television program to a recorded program list.

15. The set top box of claim 14, wherein the computer program further comprises instructions to sort the recorded program list.

16. The set top box of claim 15, wherein the recorded program list is sorted by original air dates of episodes.

17. The set top box of claim 15, wherein the recorded program list is sorted alphabetically.

18. A home entertainment system, comprising:
at least one television;
a set top box coupled to the at least one television, the set top box comprising:
a processor;
a memory device accessible by the processor; and
a computer program embedded within the memory device, the computer program comprising:
instructions to detect a request to record all episodes of a television program;
instructions to automatically fail to record one or more duplicate episodes of the television program without user input, when the one or more duplicate episodes were previously stored in the memory device and after being stored in the memory device were deleted from the memory device after being viewed; and
instructions to automatically record the one or more duplicate episodes without user input when the one or more duplicate episodes were previously stored in the memory device and after being stored in the memory device were deleted from the memory device without being viewed.

19. The home entertainment system of claim 18, wherein the computer program further comprises instructions to monitor metadata within an electronic program guide.

20. The home entertainment system of claim 19, wherein the computer program further comprises instructions to record an episode of the television program that is not presently recorded and stored at the set top box.

21. The home entertainment system of claim 20, wherein the computer program further comprises instructions to record an episode of the television program that has not been previously recorded.

22. The home entertainment system of claim 21, wherein the computer program further comprises instructions to add a title corresponding to each episode recorded at the set top box to a recorded program list.

23. The home entertainment system of claim 22, wherein the computer program further comprises instructions to sort the recorded program list.

24. The home entertainment system of claim 23, wherein the recorded program list is sorted by original broadcast dates.

25. The home entertainment system of claim 23, wherein the recorded program list is sorted alphabetically.

* * * * *